United States Patent
Takenaka

(10) Patent No.: US 9,917,983 B2
(45) Date of Patent: Mar. 13, 2018

(54) IMAGE FORMING APPARATUS AND CONTROL METHOD OF IMAGE FORMING APPARATUS FOR USING HISTORY OF SETTINGS

(71) Applicant: CANON KABUSHIKI KAISHA, Tokyo (JP)

(72) Inventor: Yoko Takenaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/790,894

(22) Filed: Jul. 2, 2015

(65) Prior Publication Data

US 2016/0006887 A1 Jan. 7, 2016

(30) Foreign Application Priority Data

Jul. 4, 2014 (JP) .................. 2014-139012

(51) Int. Cl.
G06F 3/12 (2006.01)
H04N 1/44 (2006.01)
H04N 1/00 (2006.01)
H04N 1/32 (2006.01)

(52) U.S. Cl.
CPC ......... H04N 1/4433 (2013.01); H04N 1/0097 (2013.01); H04N 1/00925 (2013.01); H04N 1/32106 (2013.01); H04N 2201/0094 (2013.01)

(58) Field of Classification Search
None
See application file for complete search history.

(56) References Cited

U.S. PATENT DOCUMENTS

| 2005/0111866 A1* | 5/2005 | Sato ................... G03G 15/5016 399/79 |
| 2007/0013942 A1* | 1/2007 | Ozawa ............... H04N 1/00347 358/1.15 |
| 2009/0204804 A1* | 8/2009 | Okubo .................... G06F 21/31 713/100 |
| 2010/0153427 A1* | 6/2010 | Schechter ......... G06F 17/30864 707/768 |
| 2011/0216339 A1* | 9/2011 | Kasahara .................. G06F 3/12 358/1.13 |
| 2012/0192257 A1* | 7/2012 | Ishii ................... H04N 1/00244 726/7 |
| 2014/0233053 A1* | 8/2014 | Kakutani .............. G06F 3/1222 358/1.14 |
| 2014/0240089 A1* | 8/2014 | Chang ................. G07C 9/00111 340/5.61 |

(Continued)

FOREIGN PATENT DOCUMENTS

JP 2005-153346 A 6/2005

*Primary Examiner* — Miya J Williams
(74) *Attorney, Agent, or Firm* — Canon U.S.A.Inc., IP Division

(57) ABSTRACT

When a user logs into an image forming apparatus, a setting by the user is registered as an operation history in an individual setting of the user if a setting mode is an "individual setting" and an operation history is registered in a device setting if the setting mode is a "device setting". If a user does not log into the image forming apparatus, an operation history is registered in the device setting. If the setting mode is the "device setting", an operation history is deleted from the device setting when the user logs out from the image forming apparatus.

20 Claims, 18 Drawing Sheets

(56) References Cited

U.S. PATENT DOCUMENTS

| | | | | |
|---|---|---|---|---|
| 2014/0320883 A1* | 10/2014 | Ichida | ............... | G07F 17/26 358/1.14 |
| 2015/0015908 A1* | 1/2015 | Tanaka | ............... | G06K 15/4095 358/1.14 |
| 2015/0261481 A1* | 9/2015 | Takenaka | ............... | G06F 3/1285 358/1.15 |

* cited by examiner

IMAGE FORMING APPARATUS AND CONTROL METHOD OF IMAGE FORMING APPARATUS FOR USING HISTORY OF SETTINGS

BACKGROUND

Field

Aspects of the present invention generally relates to an image forming apparatus of which setting can be performed using an operation history, a control method of the image forming apparatus, and a program.

Description of the Related Art

Recent image forming apparatuses have various functions, and operation contents performed by users have become complicated. Thus, setting of the apparatus takes a long time. In addition, some settings of the function are repeatedly used. In this regards, there is a function which stores a setting set by a user as an operation history and enables the user to easily reuse the setting set in the past when the user performs a call operation.

However, when operation histories are shared with a plurality of users, operation histories of other people which are less likely to be actually reused are also displayed, and it may be difficult to find an operation history of the user's own. Thus, it has been expected to enable an operator to reuse a desired operation history.

A technique discussed in Japanese Patent Application Laid-Open No. 2005-153346 can store an operation history for each authenticated individual and display the operation history of the authenticated individual from the stored operation history of each individual. Further, an arbitrary operation history can be selected from the displayed operation histories and a setting of the apparatus can be performed based on the selected operation history. Accordingly, the authenticated user can easily select the desired operation history.

However, according to Japanese Patent Application Laid-Open No. 2005-153346, when an unauthenticated user displays an operation history, operation histories of all individuals and unauthenticated operation histories are displayed. Therefore, operation histories of other people can be viewed.

SUMMARY

Aspects of the present invention are generally directed to a mechanism that can support an effective use of an operation history and protection of individual privacy (high security) at the same time.

According to the present invention, an image forming apparatus includes a first storage unit configured to store an operation history for each user, a second storage unit configured to store an operation history associated with the image forming apparatus, a setting unit configured to set a first setting in which an operation history of each user is registered or a second setting in which an operation history of each user is not registered, and a registration unit configured to, in a state in which a user logs into the image forming apparatus, register an operation history for the user in the first storage unit if the first setting is set and register an operation history associated with the image forming apparatus in the second storage unit if the second setting is set, and in a state in which a user does not log into the image forming apparatus, register an operation history associated with the image forming apparatus in the second storage unit.

According to the present disclosure, an operator can reuse a desired operation history and prevent other people from referring to the operation history. Accordingly, the operation history can be effectively used, and the privacy (high security) can be protected at the same time.

Further features of the present disclosure will become apparent from the following description of exemplary embodiments with reference to the attached drawings.

DESCRIPTION OF THE EMBODIMENTS

Various exemplary embodiments, features, and aspects will be described in detail below with reference to the drawings.

Figure 1:
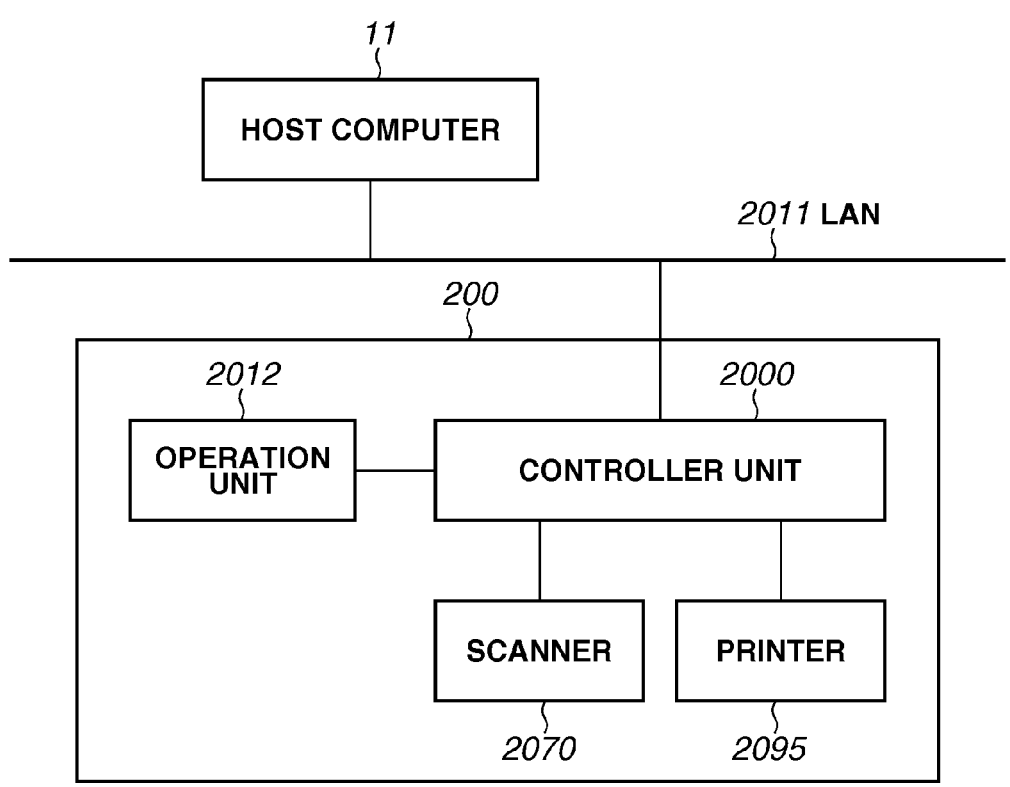
FIG. 1 is a block diagram illustrating an image output system to which an image forming apparatus according to an exemplary embodiment is applicable.

FIG. 1 is a block diagram illustrating an example of a configuration of an image output system to which an image forming apparatus according to an exemplary embodiment is applicable.

In FIG. 1, an image forming apparatus 200 includes a scanner unit 2070 as an image input device, a printer unit 2095 as an image output device, a controller unit 2000, and an operation unit 2012 as a user interface.

A host computer 11 is an information processing apparatus which functions as a client machine and includes a display device, a keyboard, a pointing device, a computer main body, and the like, which are not illustrated. The aforementioned computer main body includes a central processing unit (CPU) which has a function of loading an operating system from an external storage device, such as a hard disk drive (HDD) and a solid state drive (SSD), and executing various types of application programs. The computer main body also has a function of communicating with the image forming apparatus 200 via a network card, which is not illustrated, and a network such as a local area network (LAN) 2011, and displaying information obtained from the image forming apparatus 200 and other functions. The host computer 11 is configured to be able to operate Web browser software and communicate with the image forming apparatus 200 which executes Web server function processing by a predetermined protocol.

The scanner unit 2070, the printer unit 2095, and the operation unit 2012 are individually connected to the controller unit 2000, and the controller unit 2000 is connected to a network transmission unit, such as the LAN 2011. The controller unit 2000 is described in detail below with reference to FIG. 2.

In FIG. 1, only one image forming apparatus 200 is illustrated, however, the image output system according to the present exemplary embodiment may be an image output system in which a plurality of image forming apparatuses can communicate with each other via the network using a predetermined protocol. In addition, the present exemplary embodiment can be applied to an image output system which includes a combination of an image forming apparatus and an information processing apparatus.

Figure 2:
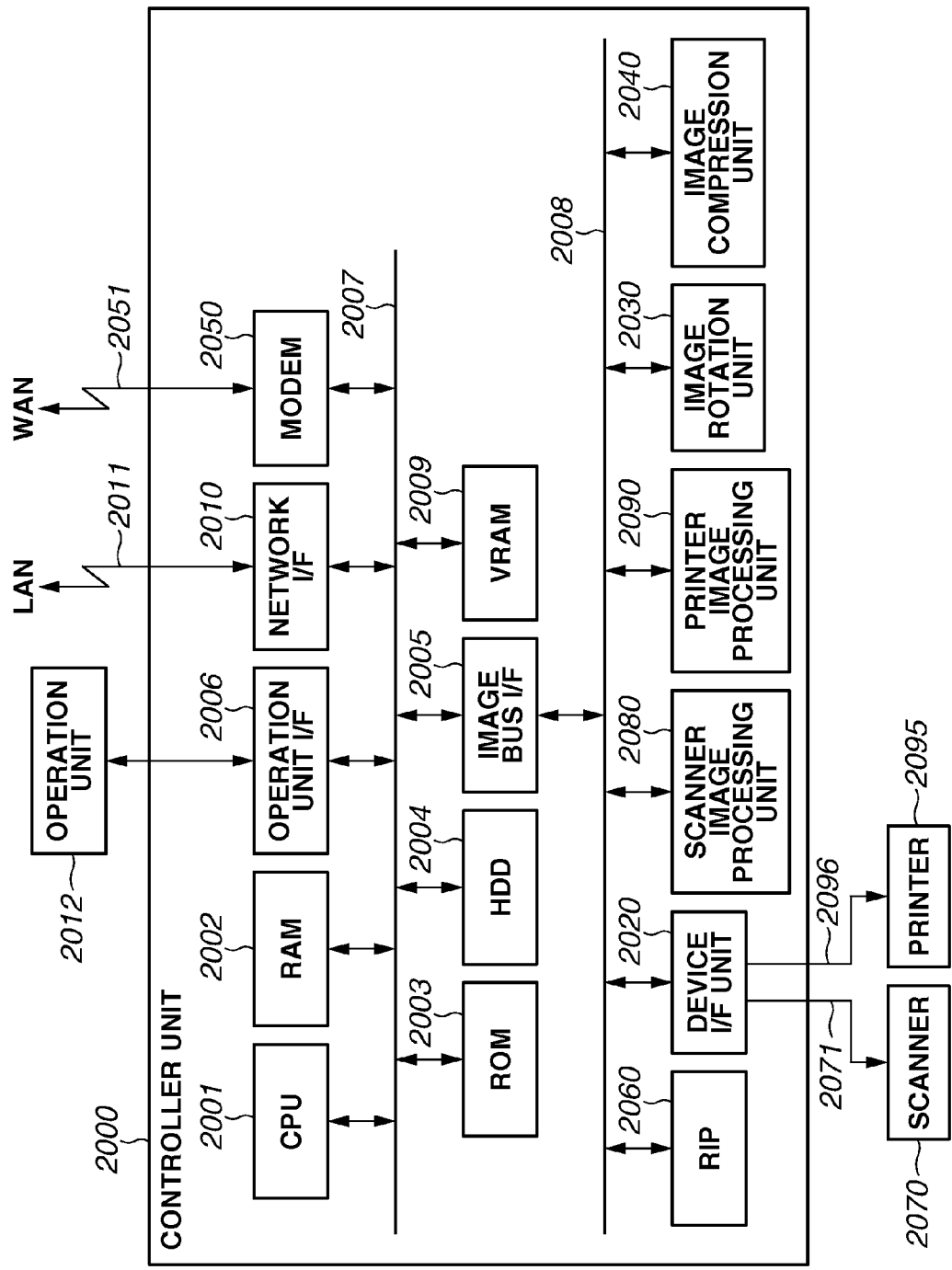
FIG. 2 is a block diagram illustrating an example of a configuration of a controller unit.

FIG. 2 is a block diagram illustrating an example of a configuration of the controller unit 2000, and the same reference numerals are attached to the same components in FIG. 1.

As illustrated in FIG. 2, the controller unit 2000 is connected to the scanner unit 2070 and the printer unit 2095. Further, the controller unit 2000 is connected to the LAN 2011 and a public line, such as a wide area network (WAN) 2051 to input and output image information and device information.

The controller unit 2000 includes a CPU 2001 which is a controller to control the entire system. A random access memory (RAM) 2002 is a system work memory for the CPU 2001 to operate and also an image memory for temporarily storing image data. A read-only memory (ROM) 2003 functions as a boot ROM and stores a system boot program. An HDD 2004 stores system software, image data, and the like. The controller unit 2000 may include other storage devices, such as an SSD.

An operation unit interface (I/F) 2006 functions as an interface unit to the operation unit 2012 and outputs image data displayed on the operation unit 2012 to the operation unit 2012. In addition, the operation unit I/F 2006 has a function of transmitting information input from the operation unit 2012 by a user of the system to the CPU 2001.

A video random access memory (VRAM) 2009 stores display screen data created in the CPU 2001. The CPU 2001 creates display screen data from display data obtained from the HDD 2004 and arranges the display screen data in the VRAM 2009 to be displayed in the operation unit 2012. The VRAM 2009 stores the image data arranged to be displayed in the operation unit 2012.

A network I/F 2010 is connected to the LAN 2011 to input and output information. A modem 2050 is connected to the public line 2051 to input and output information. The above-described devices are arranged on a system bus 2007.

An image bus I/F 2005 is a bus bridge which connects the system bus 2007 to an image bus 2008 and converts a data structure.

The image bus 2008 includes a protocol control information (PCI) bus or the Institute of Electrical and Electronics Engineers (IEEE) 1394 and transfers image data at high speed. The following devices are arranged on the image bus 2008.

A raster image processor (RIP) 2060 renders a page description language (PDL) code to a bitmap image. A device I/F unit 2020 connects the scanner unit 2070 connected via an image input unit I/F 2071 and the printer unit 2095 connected via a printing unit I/F 2096 to the CPU 2001 and performs synchronous/asynchronous conversion of image data.

A scanner image processing unit 2080 performs correction, processing, and editing on input image data. A printer image processing unit 2090 performs printer correction, resolution conversion, and the like on print output image data. An image rotation unit 2030 performs rotation processing of image data. An image compression unit 2040 performs compression and decompression processing on multi-valued image data by Joint Photographic Experts Group (JPEG) and on binary image data by Joint Bi-level Image Experts Group (JBIG), Modified Modified Read (MMR), and Modified Huffman (MH).

Figure 3:
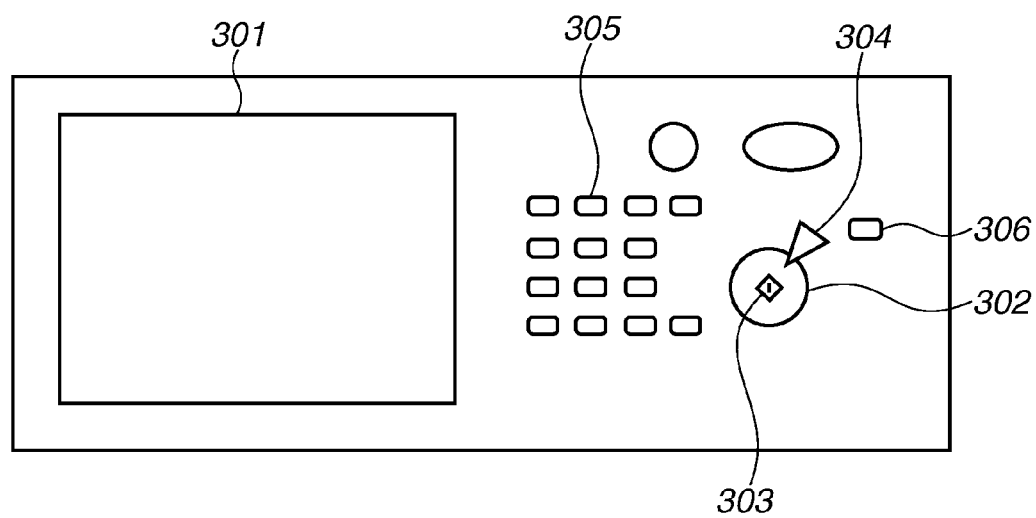
FIG. 3 illustrates an example of a device configuration of an operation unit.

FIG. 3 illustrates an example of a device configuration of the operation unit 2012.

A liquid crystal display unit 301 which includes a touch panel sheet stuck on a liquid crystal portion displays an operation screen and soft keys of the system and transmits position information of a displayed key pressed by a user to the CPU 2001 of the controller unit 2000.

A start key 302 is used when a reading operation of a document image is started. The start key 302 includes two color LED 303 of green and red in the center, and these two colors indicate whether the start key 302 is in a usable state or not. A stop key 304 is used to stop an operation being performed.

A numeric keypad 305 includes button groups of numbers and characters and is used to set a number of copies and to issue an instruction to switch a screen of the liquid crystal display unit 301. A user mode key 306 is pressed when a device setting is performed.

Figure 4:
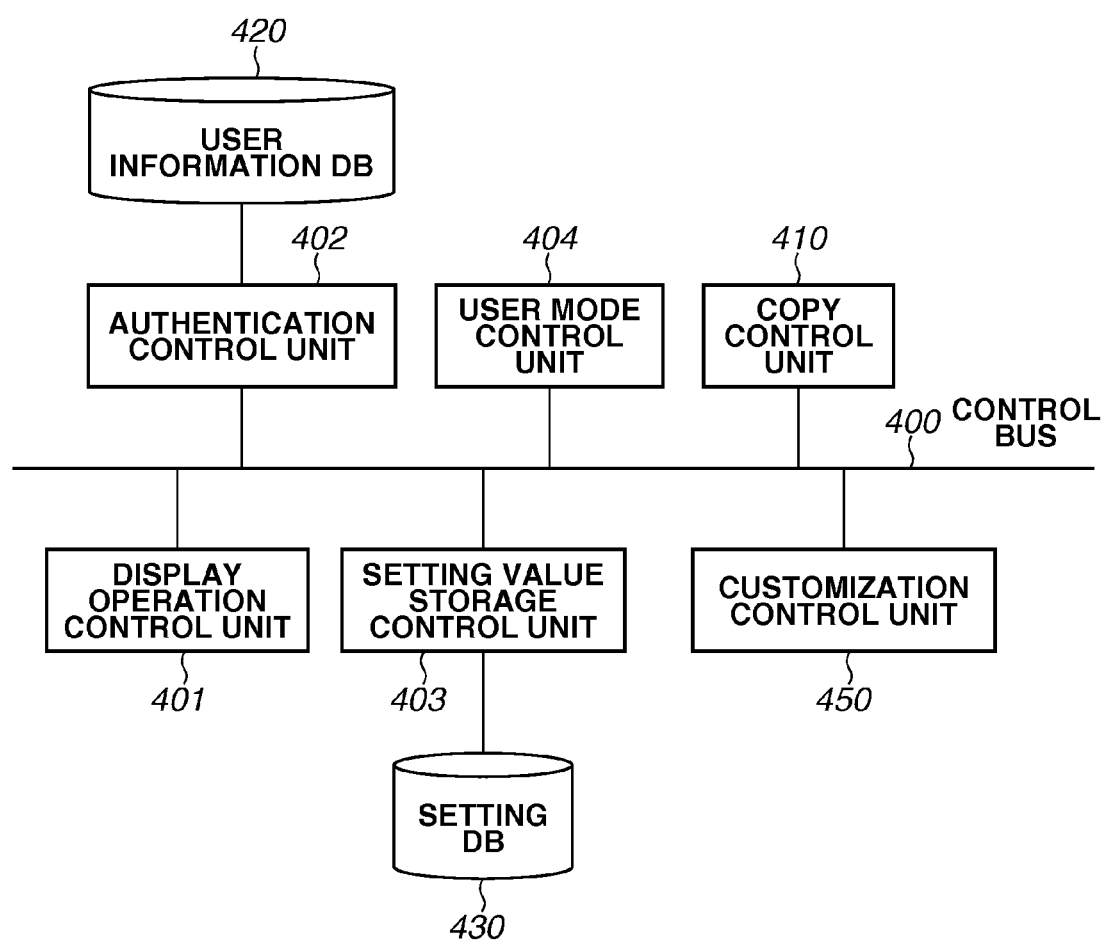
FIG. 4 illustrates an example of a configuration of the image forming apparatus.

FIG. 4 illustrates an example of a configuration of the image forming apparatus 200.

In the following descriptions, each control unit illustrated in FIG. 4 corresponds to a function which is realized by the CPU 2001 of the image forming apparatus 200 reading and executing a program stored in the ROM 2003 or the HDD 2004. In other words, each control unit is operated by control of the CPU 2001.

To a control bus 400, each of the control units, such as, a display operation control unit 401, an authentication control unit 402, a setting value storage control unit 403, and a user mode control unit 404, is connected. The control bus 400 transfers information between each control unit based on the control of the CPU 2001.

For example, the control bus 400 receives instruction information input by a user from the display operation control unit 401 and once stores the information in the RAM 2002. The control bus 400 notifies the setting value storage control unit 403 of reception of the input instruction, and the setting value storage control unit 403 reads the instruction information from the RAM 2002 and performs control according to the instruction information. Information to be transferred may be stored in the HDD 2004 instead of the RAM 2002.

The image forming apparatus 200 has one or more functions. Each function is provided with a control unit, and a copy control unit 410 is illustrated as an example. It is needless to say that each function related to the processing in the image forming apparatus 200 is provided with a corresponding control unit (not illustrated) other than the functions illustrated in FIG. 4. As an example of other functions, there is a secure print function which holds a print job input from a printer driver in the image forming apparatus 200 and allows only an authenticated user or a user who knows a password associated with the print job to perform printing. In addition, there are a box function of storing image data in the image forming apparatus 200, a help function of displaying a help screen, a facsimile (FAX) function of receiving a FAX document from a public communication network, and the like.

The display operation control unit 401 controls the operation unit I/F 2006 based on the control of the CPU 2001. For example, the display operation control unit 401 causes the liquid crystal display unit 301 to display a screen via the operation unit 2012 based on an instruction from the other control unit and obtains information input by a user from the liquid crystal display unit 301. The display operation control unit 401 notifies each control unit of the obtained information via the control bus 400 as necessary.

In the following descriptions, the transfer of information and data between each of the control units is performed via the control bus 400.

The authentication control unit 402 performs authentication processing for identifying a user (hereinbelow, referred to as login) based on the control of the CPU 2001 to determine whether an operator of the image forming apparatus 200 is a rightful user of the image forming apparatus 200. Further, the authentication control unit 402 controls a database (hereinbelow, a user information DB 420) which stores user information on the HDD 2004. The user information DB 420 stores data in the HDD 2004. The authentication control unit 402 further stores a user identifier for uniquely identifying a user in the user information DB 420. Login processing performed by the authentication control unit 402 is described below with reference to FIG. 5.

Figure 5:
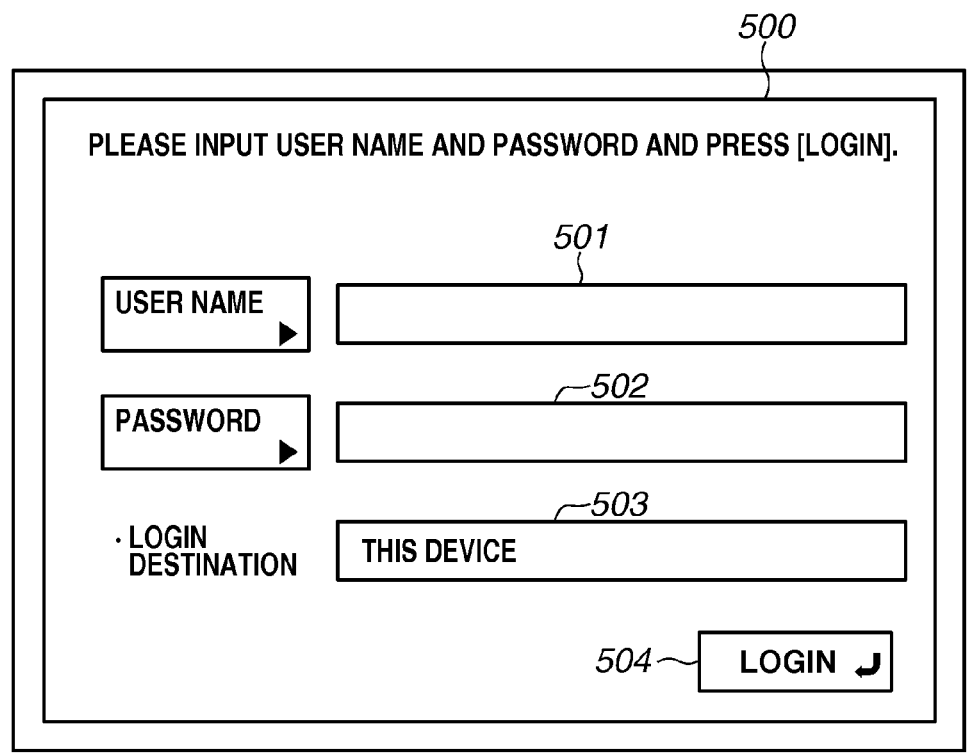
FIG. 5 illustrates an example of a login screen.

FIG. 5 illustrates an example of a login screen 500 for receiving the login processing.

In the example illustrated in FIG. 5, the login screen 500 includes a user name input form 501, a password input form 502, a login destination selection button 503, a login button 504, and the like.

When receiving a login request from a user, the display operation control unit 401 displays the login screen 500. The display operation control unit 401 respectively receives input of a user name and a password from the user name input form 501 and the password input form 502. The authentication control unit 402 receives the input user name and password from the display operation control unit 401 and checks whether the received user name and password match with a user name and a password in the user information DB 420.

Figure 6:
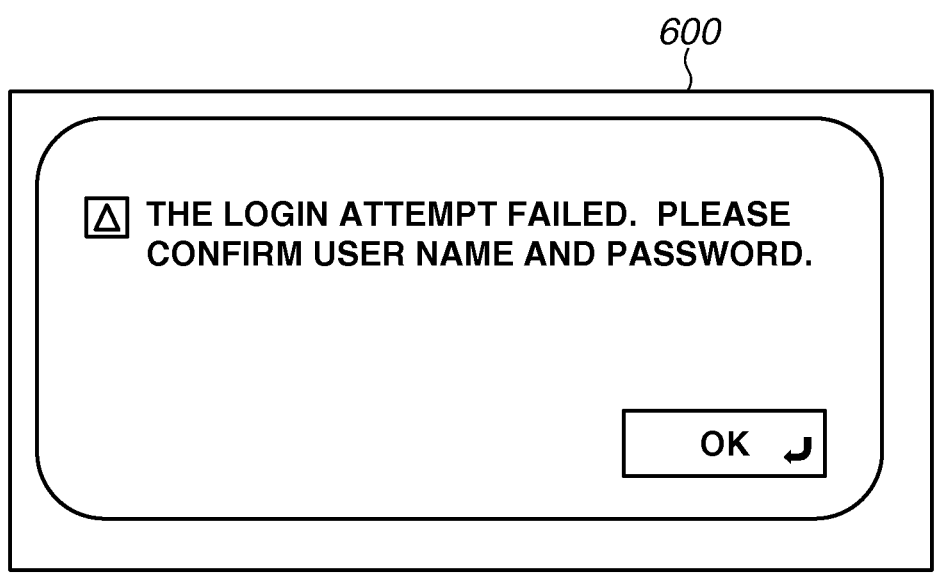
FIG. 6 illustrates an example of a warning pop-up screen.

When the received user name and password do not match with the stored ones as a result of the check, the authentication control unit 402 determines that the login failed and notifies the user via the display operation control unit 401 of the login failure (FIG. 6). In response to the notification, the display operation control unit 401 displays a warning screen illustrated in FIG. 6.

FIG. 6 illustrates an example of a warning pop-up screen when the login to the image forming apparatus fails.

On the other hand, the received user name and password match with the stored ones as a result of the check, the authentication control unit 402 determines that the authentication is successful, changes an authentication state from a non-login state to a login state, and issues an identifier for uniquely identifying a user (hereinbelow, referred to as a user identifier). The authentication control unit 402 notifies the user via the display operation control unit 401 of a successful login and terminates the login processing.

The authentication method is not limited to the above-described one which uses a user name and a password, and other authentication methods may be applied which uses a non-contact type integrated circuit (IC) card, biometric authentication, and the like. The image forming apparatus 200 may perform authentication by an external authentication server as in the case of the Active Directory (AD) of Microsoft instead of including the user information DB 420 therein. In the case of this configuration, the authentication control unit 402 requests the external authentication server to authenticate and check via the network I/F 2010. In addition, the user information DB 420 in the image forming apparatus 200 and the external authentication server may be switched. As in the case of FIG. 5, a user selects an authentication server to perform authentication using the login destination selection button 503.

When a logout instruction is received from a user, the authentication control unit 402 changes the authentication state from the login state to the non-login state and terminates the logout processing.

The authentication control unit 402 provides functions of registering and deleting a user and updating user information.

Next, the setting value storage control unit 403 is described.

The setting value storage control unit 403 is a control unit for storing a device setting and an individual setting based on the control of the CPU 2001. The device setting is a setting shared and referred to by a plurality of users. The individual setting is a setting for each user which is referred to by only the each relevant user. The setting value storage control unit 403 stores a device setting value and an individual setting value in a setting DB 430 in the HDD 2004. A configuration of the setting DB 430 is described below with reference to FIG. 12.

Figure 12:
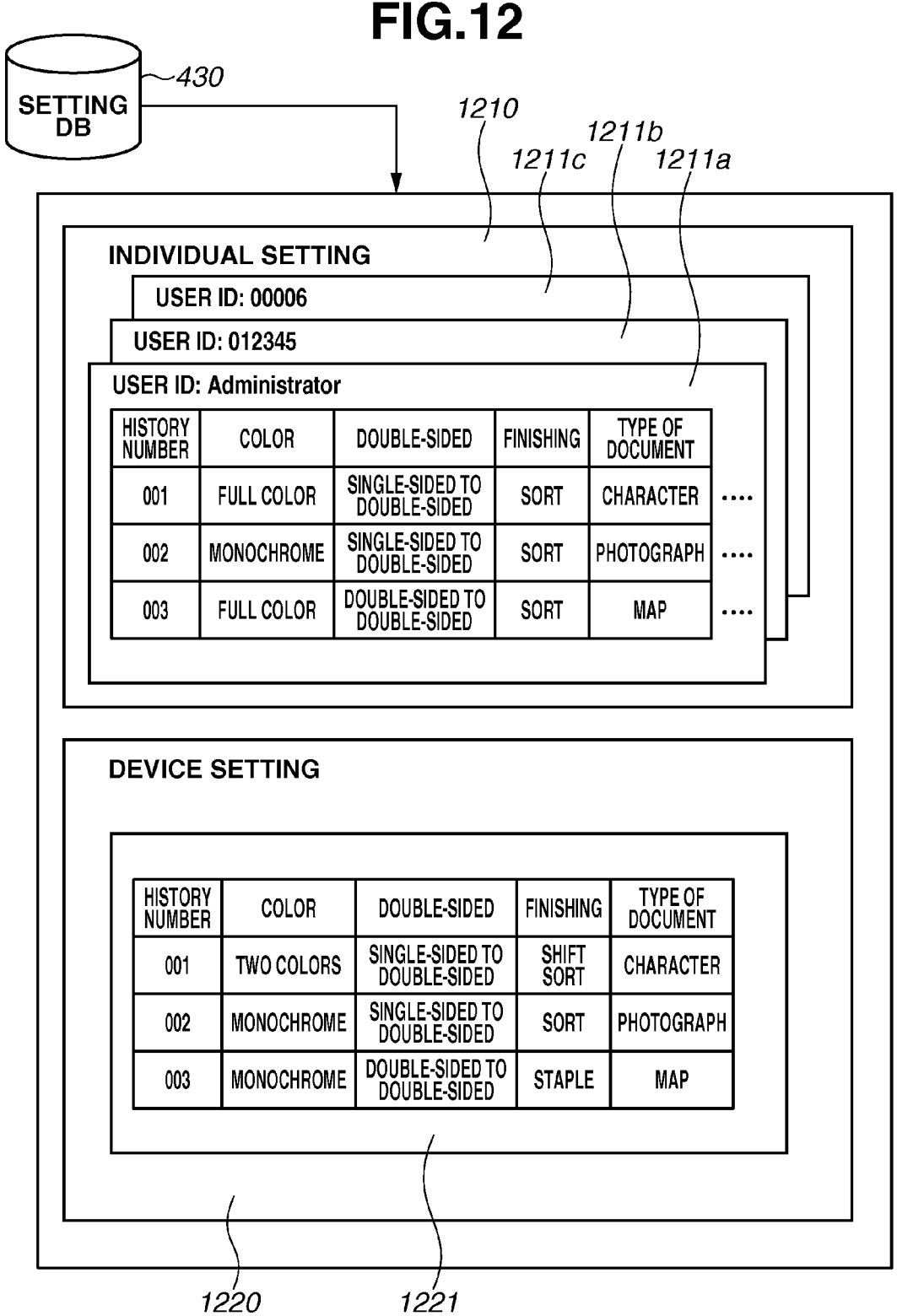
FIG. 12 illustrates an example of a data configuration of a setting database (DB).

FIG. 12 illustrates an example of a data configuration of the setting DB 430.

As illustrated in FIG. 12, the setting DB 430 includes an individual setting storage area 1210 for storing data for each user associated with the authentication (an individual setting value) and a device setting storage area 1220 for storing a unique setting in the device (a device setting value).

In the example illustrated in FIG. 12, the individual setting storage area 1210 stores operation history data pieces 1211*a* to 1211*c* of each user associated with the user identifier. On the other hand, the device setting storage area 1220 stores operation history data 1221 shared with unauthenticated users.

In FIG. 12, a history number, color, double-sided, finishing, and a type of document are described as examples of setting information stored in the operation history data 1221, however, the operation history data 1221 can store other setting items related to a job. According to the present exemplary embodiment, although an operation history table for copying is only described, all setting items related to other functions that the image forming apparatus 200 can include, such as the box function, the scanner function, and the transmission function can be stored as operation histories.

Next, the copy control unit 410 is described.

The copy control unit 410 controls a function of reading and copying a paper document and printing the read document (hereinbelow, referred to as a copy function). The copy control unit 410 reads image data from the scanner unit 2070, performs image processing on the read image data by an image processing control unit, and outputs the image data subjected to the image processing to the printer unit 2095.

Examples of settings of the copy function includes, a layout (Nin1) setting for specifying N sheets of a document to generate a sheet of copy image therefrom, a double-sided setting for specifying whether to read one side or both sides of a document, and others. In addition, there is a color mode setting for specifying color of printing, such as full color, monochromatic, and a single color. These setting items for performing the copy function are referred to as job settings. The job settings related to the copy function can be specified from a copy job setting screen (FIG. 7).

Figure 7:
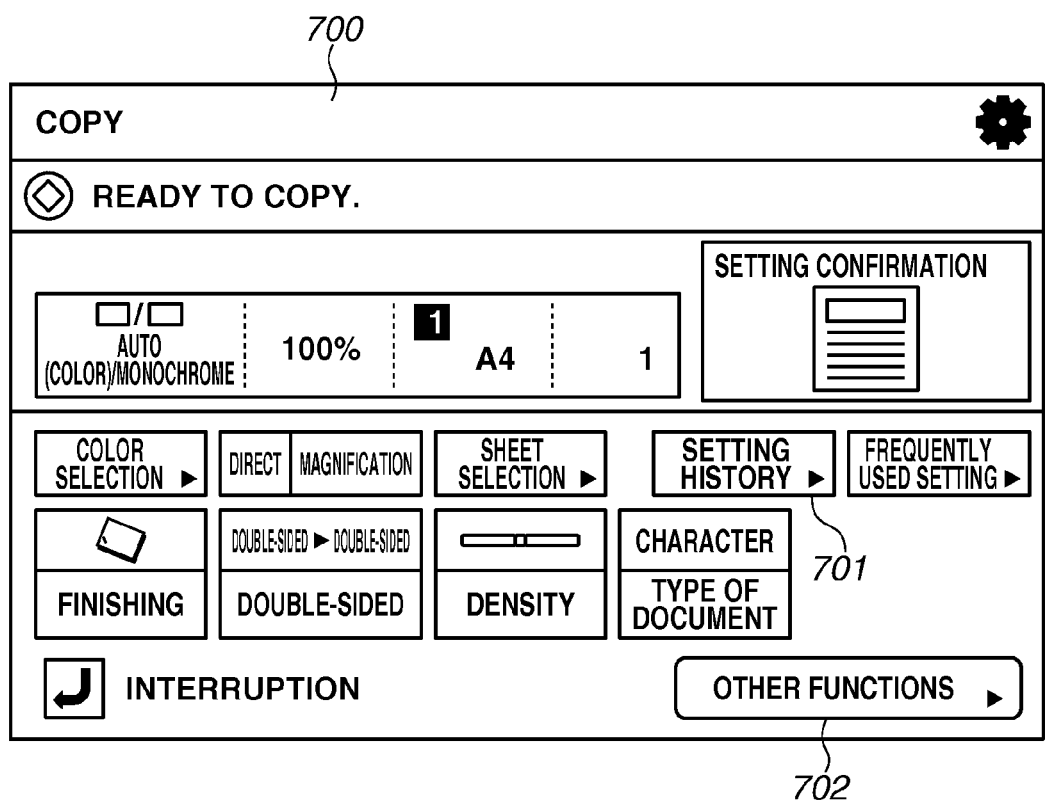
FIG. 7 illustrates an example of a copy job setting screen.

FIG. 7 illustrates an example of the copy job setting screen.

Functions not illustrated in FIG. 7 can be set at another screen displayed by selecting an other functions button 702, however, descriptions thereof are omitted.

The copy function includes a function (hereinbelow, referred to as a call function) of storing a history of a job setting when a user performs the copy function and reading the job setting stored in the history from a copy job setting screen 700.

The call function can store a plurality of job setting histories, however, it is assumed that a storage upper limit is "three" as an example. The copy control unit 410 stores the last history, the second last history, and the third last history of the job setting in the setting DB 430 every time a user performs copy and deletes the history exceeding the upper limit from the oldest one.

When a setting history button 701 on the copy job setting screen 700 is selected, a call screen 800 (FIG. 8) is displayed by the display operation control unit 401.

Figure 8:
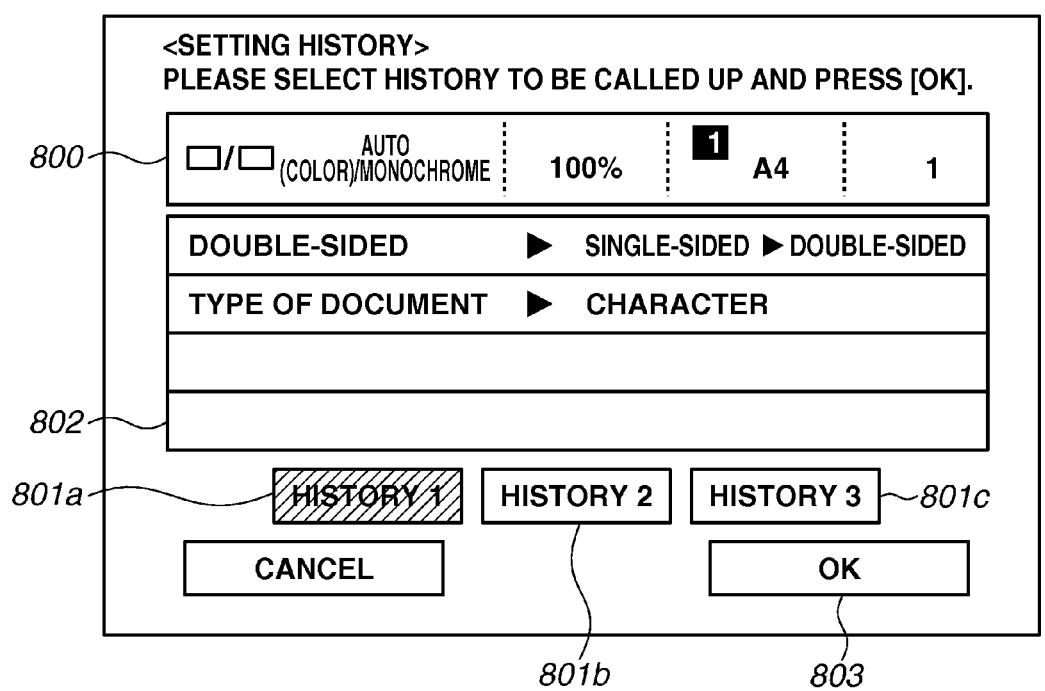
FIG. 8 illustrates an example of a call screen.

FIG. 8 illustrates an example of the call screen to call a history of a job setting.

As illustrated in FIG. 8, the call screen 800 includes history specifying buttons 801*a* to 801*c* and a job setting confirmation list 802. The history specifying buttons 801*a* to 801*c* are buttons used by the user to specify a history to be called which are previously performed. In the example in FIG. 8, the last history, the second last history, and the third last history are respectively called by operations of a "history 1" button 801*a*, a "history 2" button 801*b*, and a "history 3" button 801*c*.

The job setting confirmation list 802 displays contents of the job setting regarding each history. The example in FIG. 8 shows that "single-sided to double-sided" (namely, a single-sided document is copied to both sides of a recording sheet) is registered in double-sided, and "character" is registered in a type of document as the history in the job setting corresponding to the "history 1" button 801*a*. When any of the history specifying buttons 801*a* to 801*c* is selected, and an OK button 803 is pressed, the history of the job setting stored in the setting DB 430 is called, and the history of the called job setting is reflected to the copy job setting screen 700.

Next, a customization control unit 450 is described.

The customization control unit 450 restricts whether a setting of a customization target item can be changed as an individual setting based on the control of the CPU 2001 and performs reflection processing on the individual setting according to authentication by the authentication control unit 402 if the customization target item can be set as the individual setting.

Figure 9A:
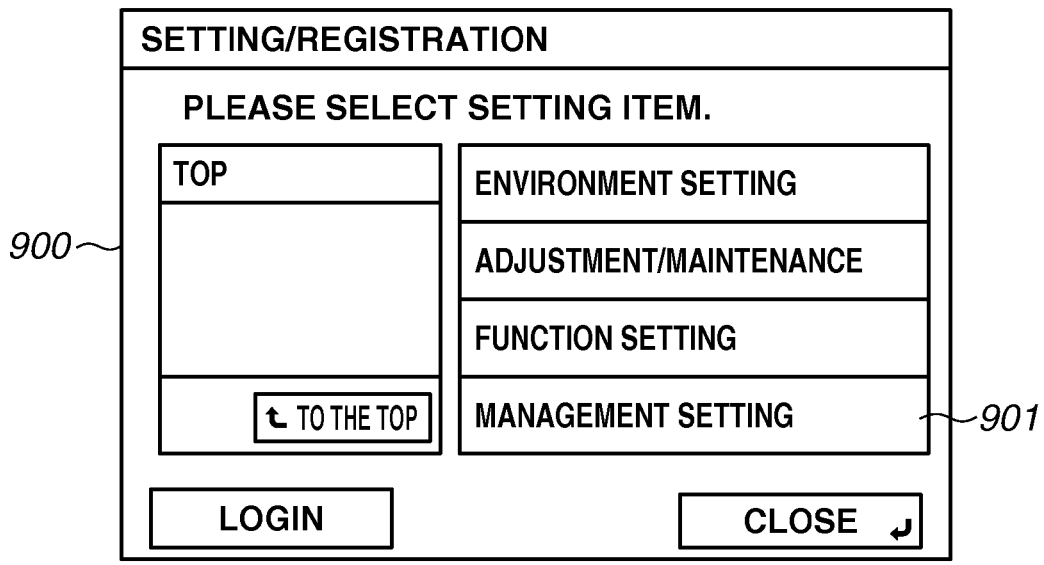
FIGS. 9A and 9B illustrate examples of a customization setting screen.
Figure 9A:
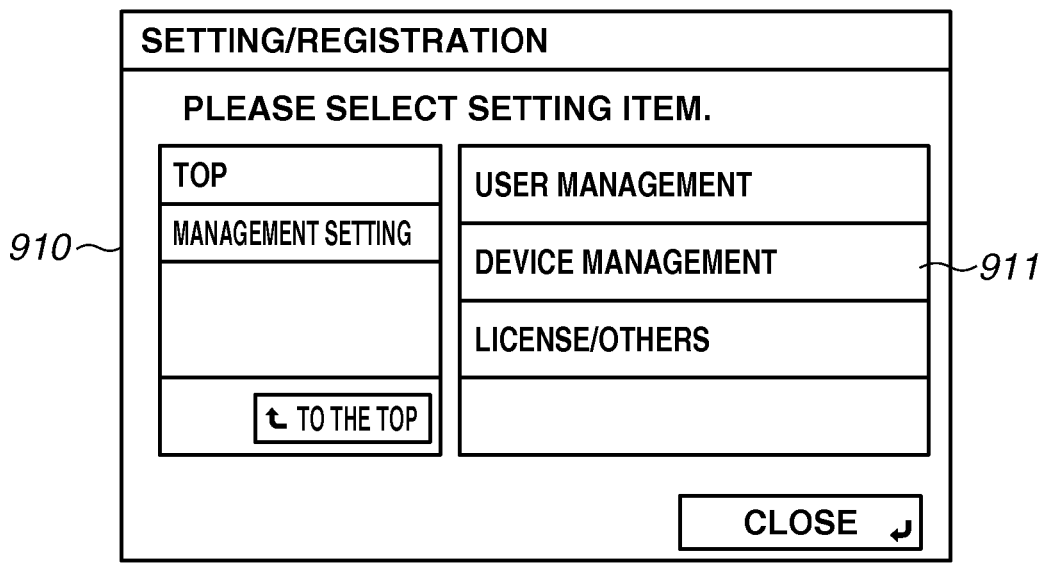
Figure 9B:
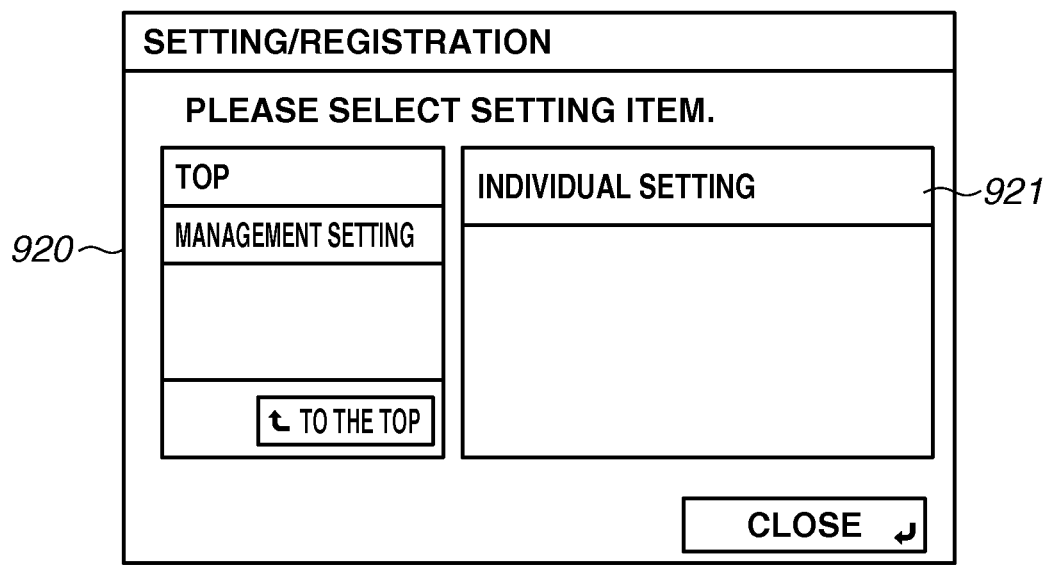
Figure 9B:
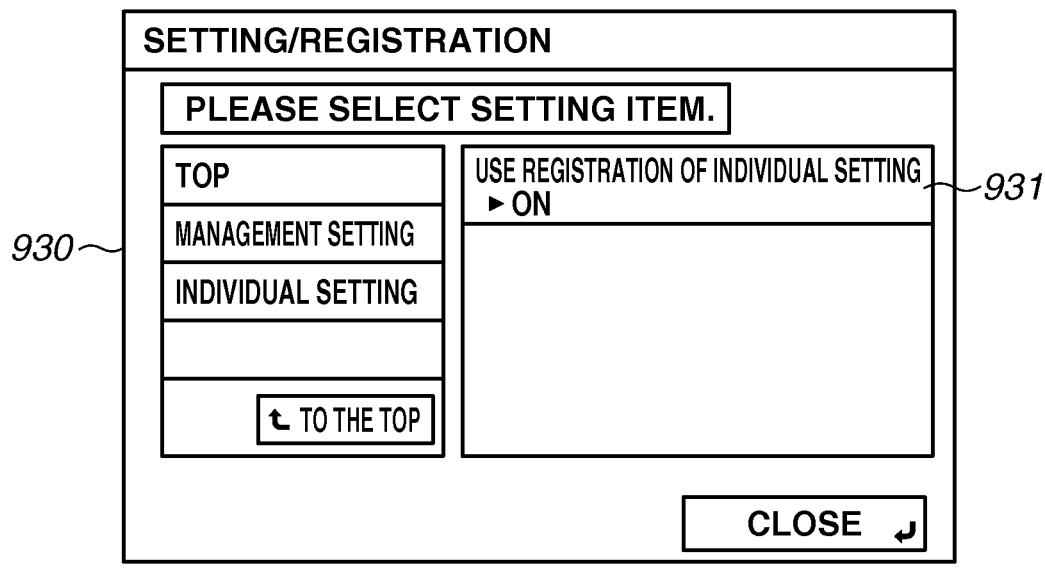
Figure 10:
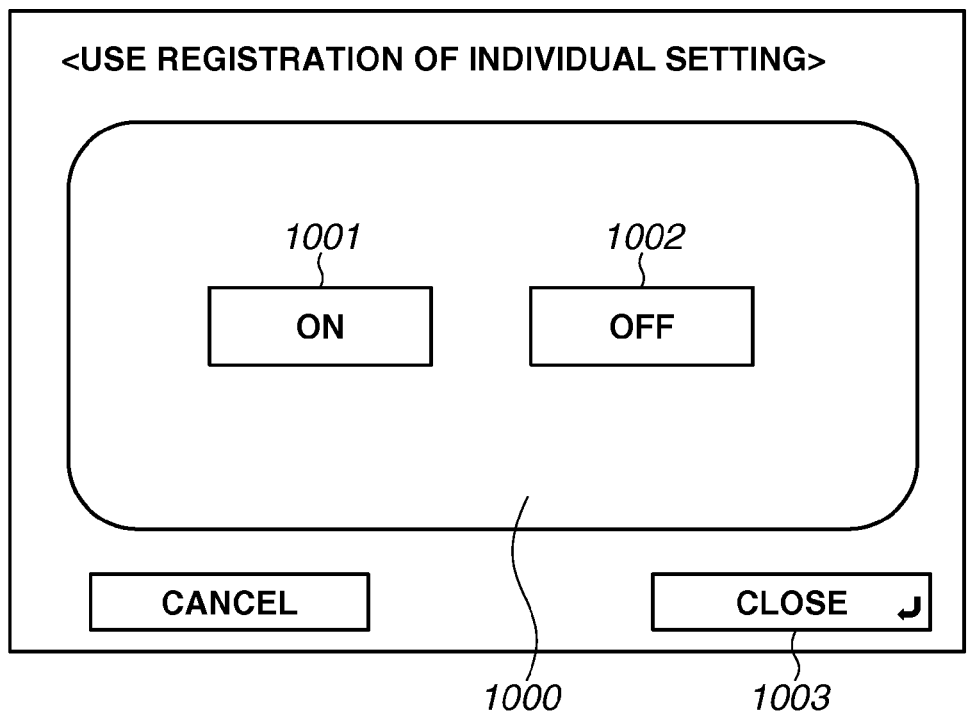
FIG. 10 illustrates an example of a customization setting screen.

FIGS. 9A, 9B, and 10 illustrate examples of a customization setting screen.

A case is described as an example in which a user mode for changing the setting related to the image forming apparatus 200 includes a customization setting change mode.

When the user mode key 306 of the operation unit 2012 is pressed, a top hierarchy screen 900 (FIG. 9A) of the user mode is displayed by the display operation control unit 401.

When a "management setting" button 901 on the top hierarchy screen 900 of the user mode is pressed, the screen is shifted to a management setting change screen 910 by the control of the display operation control unit 401. Further, when a "device management" button 911 on the management setting change screen 910 is pressed, the screen is shifted to a device management change screen 920 by the control of the display operation control unit 401.

When an "individual setting" button 921 on the device management change screen 920 is pressed, the screen is shifted to an individual setting change screen 930 by the control of the display operation control unit 401. When a "use of registration of individual setting" button 931 on the individual setting change screen 930 is pressed, a customization setting screen 1000 (FIG. 10) is displayed by the control of the display operation control unit 401.

When an ON (the individual setting is registered) button 1001 is selected, and an OK button 1003 is pressed on the customization setting screen 1000, the use of registration of the individual setting is set to ON. In the case of this setting, a setting of the customization target item in the image forming apparatus 200 is registered as the individual setting. In other words, the operation history can be registered as the individual setting in this setting.

On the other hand, when an OFF (the individual setting is not registered) button 1002 is selected, and the OK button 1003 is pressed, the use of registration of the individual setting is set to OFF. In the case of this setting, all settings in the image forming apparatus 200 are registered as the device setting. In other words, the operation history cannot be registered as the individual setting in this setting.

The customization setting illustrated in FIGS. 9A, 9B, and 10 can be performed only when a user having an administrator authority logs in to the apparatus, and the customization setting is stored in the setting DB 430.

Figure 11:
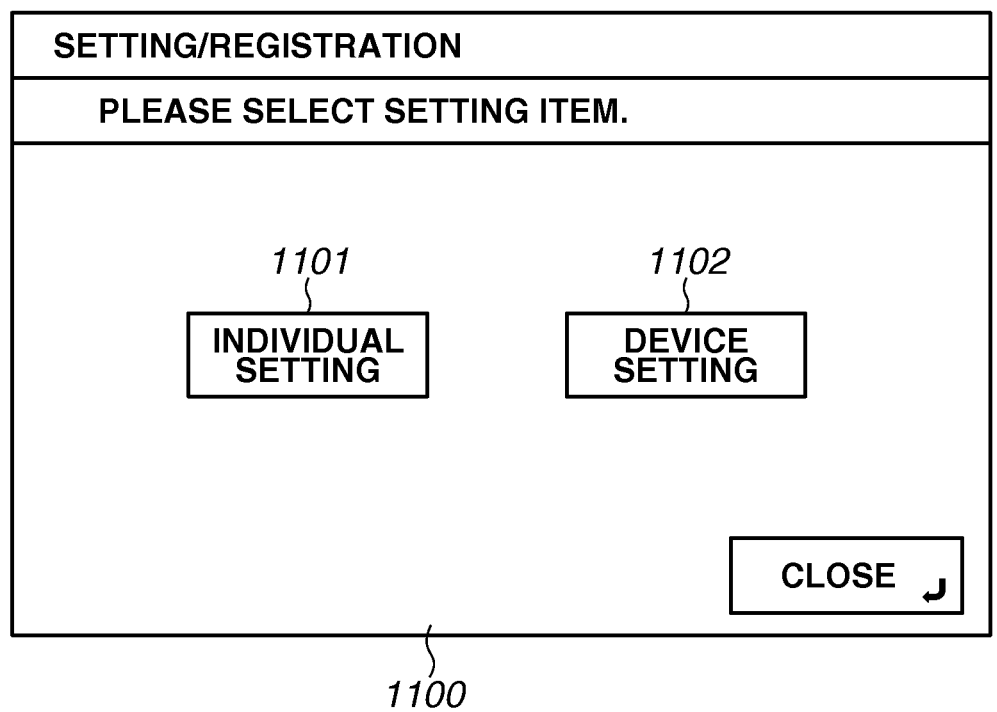
FIG. 11 illustrates an example of a setting mode selection screen.
Figure 13A:
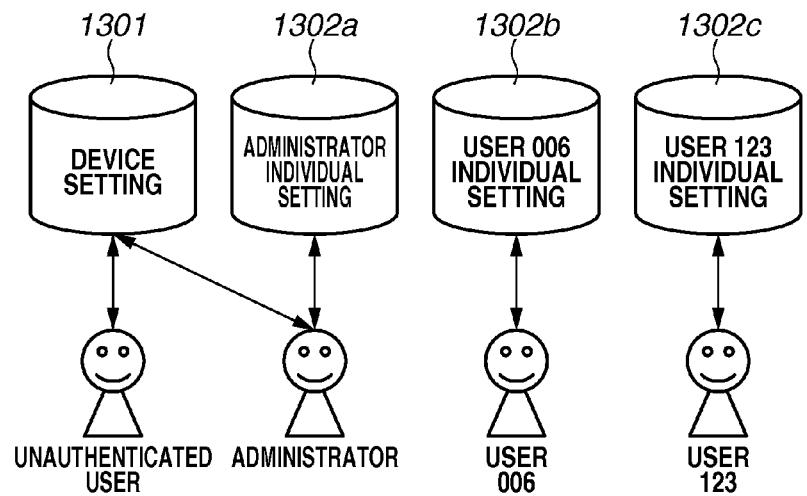
FIGS. 13A and 13B illustrate examples of referring to the setting DB.

When the user having the administrator authority is authenticated in a state in which the above-described use of registration of the individual setting is set to ON, a setting mode selection screen 1100 illustrated in FIG. 11 is displayed by the display operation control unit 401. In the state in which the above-described use of registration of the individual setting is set to ON, as illustrated in FIG. 13A, which is described below, the user having the administrator authority can perform an operation using the same setting item as a setting of either the individual setting or the device setting. Thus, when the user having the administrator authority logs in to the apparatus, the setting mode selection screen 1100 illustrated in FIG. 11 is displayed to prompt the user to select whether the setting item is used as the individual setting or the device setting to perform the operation. In other words, the user is caused to select an operation history of either the individual setting or the device setting to use.

FIG. 11 illustrates an example of the setting mode selection screen to cause the administrator to select the individual setting or the device setting to perform the operation.

The administrator uses a button of an individual setting 1101 when selecting a mode for performing the operation using the setting item as the individual setting. The administrator uses a button of a device setting 1102 when selecting a mode for performing the operation using the setting item as the device setting.

According to the setting mode selected in the setting mode selection screen 1100, the administrator can register and display an operation history of the individual setting or the device setting. The administrator may select the "device setting" in a case where, for example, the administrator refers to (manages) a history of a user (guest) who uses the image forming apparatus 200 without logging in (without performing user authentication).

The setting of the setting mode illustrated in FIG. 11 is stored in the setting DB 430.

Figure 13B:
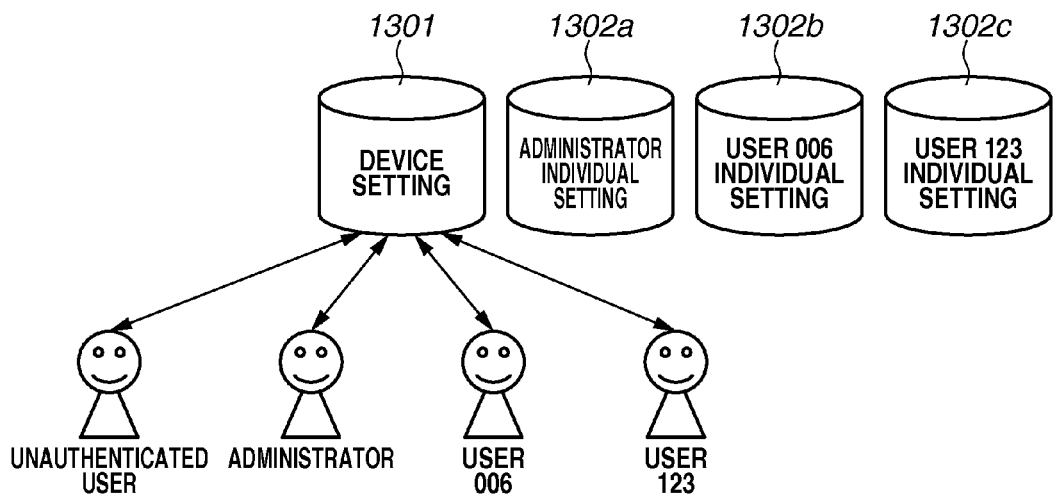

FIGS. 13A and 13B illustrate examples of how a user refers to the device setting or the individual setting with respect to the setting DB 430.

FIG. 13A illustrates an example when data in the setting DB is referred to in the state in which the above-described use of registration of the individual setting is set to ON.

An unauthenticated user performs processing for reading and writing data with respect to the device setting 1301. When the administrator selects the device setting 1102 on the setting mode selection screen 1100, the administrator performs processing for reading and writing data with respect to the device setting 1301.

On the other hand, the administrator (when the individual setting 1101 is selected), a user 006, and a user 123 who are authenticated users read and write data with respect to individual settings 1302a to 1302c associated with the user identifier.

The individual settings 1302a to 1302c cannot be referred to by another user whose user identifier does not match with the stored one.

FIG. 13B illustrates an example when data in the setting DB is referred to in the state in which the above-described use of registration of the individual setting is set to OFF. The same reference numerals are attached to the same components in FIG. 13A.

In the state in which the use of registration of the individual setting is set to OFF, the unauthenticated user, the administrator, the user 006, and the user 123 share the device setting 1301 to perform reading and writing. The individual settings 1302a to 1302c are not referred to in the state in which the use of registration of the individual setting is set to OFF.

Flowcharts regarding operations of an operation history (hereinbelow, referred to as a call setting) according to the present exemplary embodiment are described below with reference to FIGS. 14 to 17.

Figure 14:
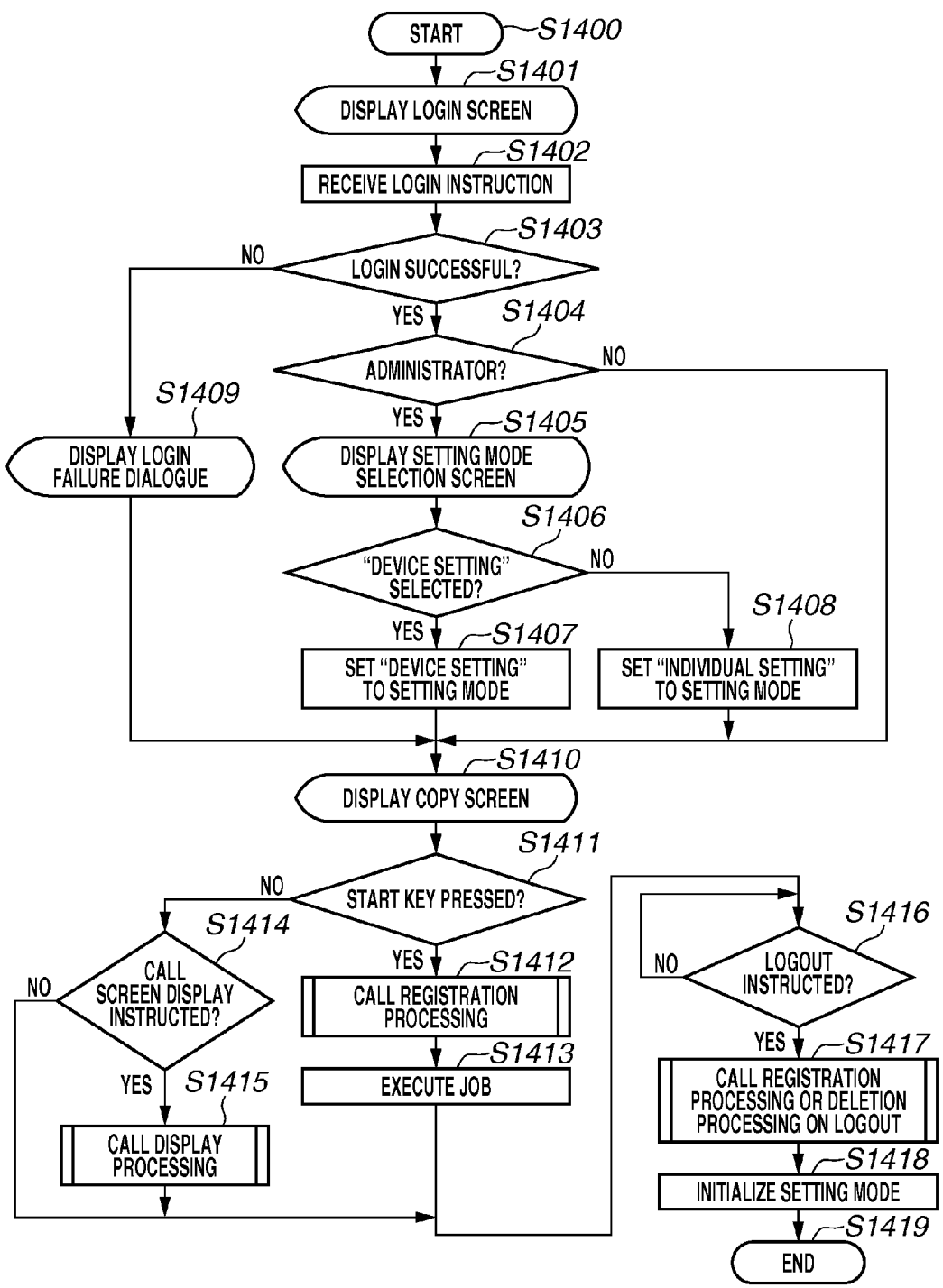
FIG. 14 is a flowchart illustrating an example of a series of processing regarding an operation history.

FIG. 14 is a flowchart illustrating an example of a series of processing regarding a call setting from login to logout according to the present exemplary embodiment. Each operation illustrated in the flowchart in FIG. 14 is realized by the CPU 2001 of the image forming apparatus 200 executing a control program stored in the ROM or the HDD.

In step S1400, the CPU 2001 of the image forming apparatus 200 starts the processing in the present flowchart in a state in which the CPU 2001 can receive an operation regarding the apparatus from the operation unit 2012. In step S1400, the "individual setting" which is an initial value is set as a value of the setting mode set by the setting mode selection screen 1100 (FIG. 11).

In step S1401, the CPU 2001 displays the login screen 500 on the operation unit 2012. In step S1402, when receiving a login instruction (including a user name and a password) from a user via the login screen 500, the CPU 2001 advances the processing to step S1403.

In step S1403, the CPU 2001 performs login processing which includes authentication using the user name and password received in step S1402 and determines whether the login is successful.

If it is determined that the login failed (NO in step S1403), the CPU 2001 advances the processing to step S1409. In step S1409, the CPU 2001 displays a login failure dialogue 600 on the operation unit 2012 and advances the processing to step S1410.

Whereas, if it is determined that the login is successful (YES in step S1403), the CPU 2001 advances the processing to step S1404.

In step S1404, the CPU 2001 determines whether the currently logged in user (i.e., a login user) is a user who has the administrator authority (i.e., an administrator). If it is determined that the login user is not the administrator (NO in step S1404), the CPU 2001 directly advances the processing to step S1410.

Whereas, if it is determined that the login user is the administrator (YES in step S1404), the CPU 2001 advances the processing to step S1405.

In step S1405, the CPU 2001 displays the setting mode selection screen 1100 as illustrated in FIG. 11 on the operation unit 2012. Next, in step S1406, the CPU 2001 determines whether the administrator selects the device setting 1102 on the setting mode selection screen 1100.

If it is determined that the device setting 1102 is selected (YES in step S1406), the CPU 2001 advances the processing to step S1407. In step S1407, the CPU 2001 sets the "device setting" to the setting mode, stores the setting in the setting DB 430, and advances the processing to step S1410.

Whereas, if it is determined that the individual setting 1101 is selected (NO in step S1406), the CPU 2001 advances the processing to step S1408. In step S1408, the CPU 2001 sets the "individual setting" to the setting mode, stores the setting in the setting DB 430, and advances the processing to step S1410.

In step S1410, the CPU 2001 displays the copy job setting screen 700 on the operation unit 2012.

Next, in step S1411, the CPU 2001 determines whether the user presses the start key 302.

If it is determined that the start key 302 is pressed (YES in step S1411), then in step S1412, the CPU 2001 performs the call registration processing illustrated in FIG. 15, which is described below. In step S1413, the CPU 2001 performs job execution processing and advances the processing to step S1416.

Whereas, if it is determined that the start key 302 is not pressed (NO in step S1411), the CPU 2001 advances the processing to step S1414. In step S1414, the CPU 2001 determines whether a display instruction of the call screen 800 is received from the user (the setting history button 701 of the setting is pressed).

If it is determined that the call screen display instruction is received (YES in step S1414), then in step S1415, the CPU 2001 performs call display processing illustrated in FIG. 17, which is described below, and advances the processing to step S1416.

Whereas, if it is determined that the call display instruction is not received (NO in step S1414), the CPU 2001 directly advances the processing to step S1416.

In step S1416, the CPU 2001 determines whether a logout instruction is received from the user. If it is determined that the logout instruction is not received (NO in step S1416), the CPU 2001 repeats the processing in step S1416 until the logout instruction is received. In this regard, the CPU 2001 performs processing in response to a user operation until the logout instruction is received. For example, when a call setting registration instruction is received from the user, the CPU 2001 performs the call registration processing illustrated in FIG. 15, which is described below. Further, when the call setting display instruction is received from the user, the CPU 2001 performs the call display processing illustrated in FIG. 17, which is described below. Furthermore, the CPU 2001 executes various functions, such as the copy function, the box function, the help function, and the fax function. The aforementioned call setting registration instruction is any operation (instruction) by a user, for example, pressing of a start key when executing copying, pressing of a reset key, an operation for shifting to a power saving mode or the like, and a call operation of a mode memory. The aforementioned call setting display instruction is, for example, an operation (instruction) of the history specifying button 801*a* to 801*c* as illustrated in FIG. 8.

Whereas, if it is determined that the logout instruction is received (YES in step S1416), the CPU 2001 advances the processing to step S1417.

In step S1417, the CPU 2001 performs the call setting registration or deletion processing when logging out illustrated in FIG. 16, which is described below.

Last, in step S1418, the CPU 2001 performs initialization processing of the setting mode. In the initialization processing of the setting mode, the CPU 2001 sets the "individual setting" to the setting mode and stores the setting in the setting DB 430. Then, in step S1419, the CPU 2001 terminates a series of processing regarding the call setting from the login to the logout.

Figure 15:
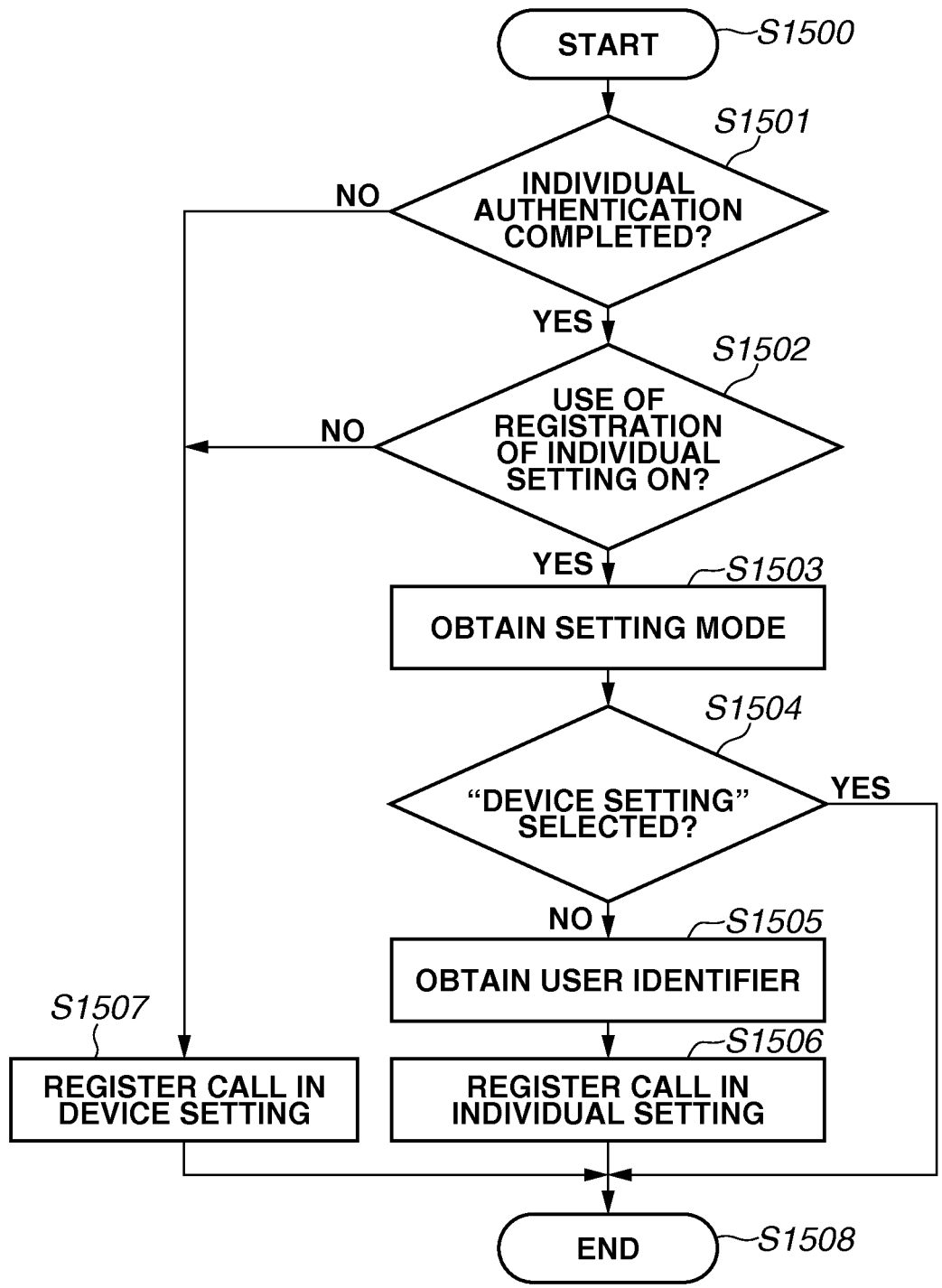
FIG. 15 is a flowchart illustrating an example of call registration processing.

FIG. 15 is a flowchart illustrating an example of the call registration processing in step S1412 in FIG. 14. Each operation illustrated in the flowchart in FIG. 15 is realized by the CPU 2001 of the image forming apparatus 200 executing a control program stored in the ROM or the HDD. The example illustrated in FIG. 15 describes a processing procedure for registering the call setting in either of the individual setting or the device setting in the setting DB 430 when a user issues a call setting registration instruction.

In step S1500, the CPU 2001 starts the call registration processing in response to reception of the call setting registration instruction from a user. As described above, the call setting registration instruction is any operation (instruction) by a user, for example, pressing of the start key when executing copying, pressing of the reset key, an operation for shifting to the power saving mode or the like, and a call operation of the mode memory.

In step S1501, the CPU 2001 determines whether the apparatus is in a state in which the individual authentication has been completed. If it is determined as a non-individual authentication state (a state in which no user is logged in) (NO in step S1501), the CPU 2001 advances the processing to step S1507. In step S1507, the CPU 2001 stores the job setting which is set when the call setting registration instruction is received in step S1500 as the device setting in the setting DB 430.

In the case of the example in FIG. 12, the CPU 2001 creates the operation history data 1221 in the device setting storage area 1220. If the operation history data 1221 is already existing, the CPU 2001 overwrites the operation history data 1221.

When completing the processing in step S1507, then in step S1508, the CPU 2001 terminates the call registration processing.

Whereas, if it is determined as an individual authentication state (a state in which a user is logged in) (YES in step S1501), the CPU 2001 advances the processing to step S1502. In step S1502, the CPU 2001 determines whether the use of registration of the individual setting is set to ON.

If it is determined that the use of registration of the individual setting is set to OFF (a setting not to register the individual setting) (NO in step S1502), the CPU 2001 advances the processing to step S1507. The processing in step S1507 is already described above, so that the description thereof is omitted.

Whereas, if it is determined that the use of registration of the individual setting is set to ON (a setting to register the individual setting) (YES in step S1502), the CPU 2001 advances the processing to step S1503.

In step S1503, the CPU 2001 obtains a value of the setting mode from the setting DB 430. In step S1504, the CPU 2001 determines whether the setting mode obtained in step S1503 is the "device setting".

If it is determined that the setting mode is the "device setting" (YES in step S1504), in step S1508, the CPU 2001 terminates the call registration processing as it is without registering the operation history.

Whereas, if it is determined that the setting mode is the "individual setting" (NO in step S1504), the CPU 2001 advances the processing to step S1505. In step S1505, the CPU 2001 obtains the user identifier of the user authenticated by the authentication control unit 402 from the user information DB 420.

Next, in step S1506, the CPU 2001 associates the job setting which is set when the call setting registration instruction is received in step S1500 with the user identifier obtained in step S1505 and stores the job setting as the individual setting in the setting DB 430.

In the case of the example in FIG. 12, the CPU 2001 creates the operation history data 1211 in the individual setting storage area 1210. If the operation history data 1211 is already existing, the CPU 2001 overwrites the operation history data 1211.

When completing the processing in step S1506, then in step S1508, the CPU 2001 terminates the call registration processing.

Figure 16:
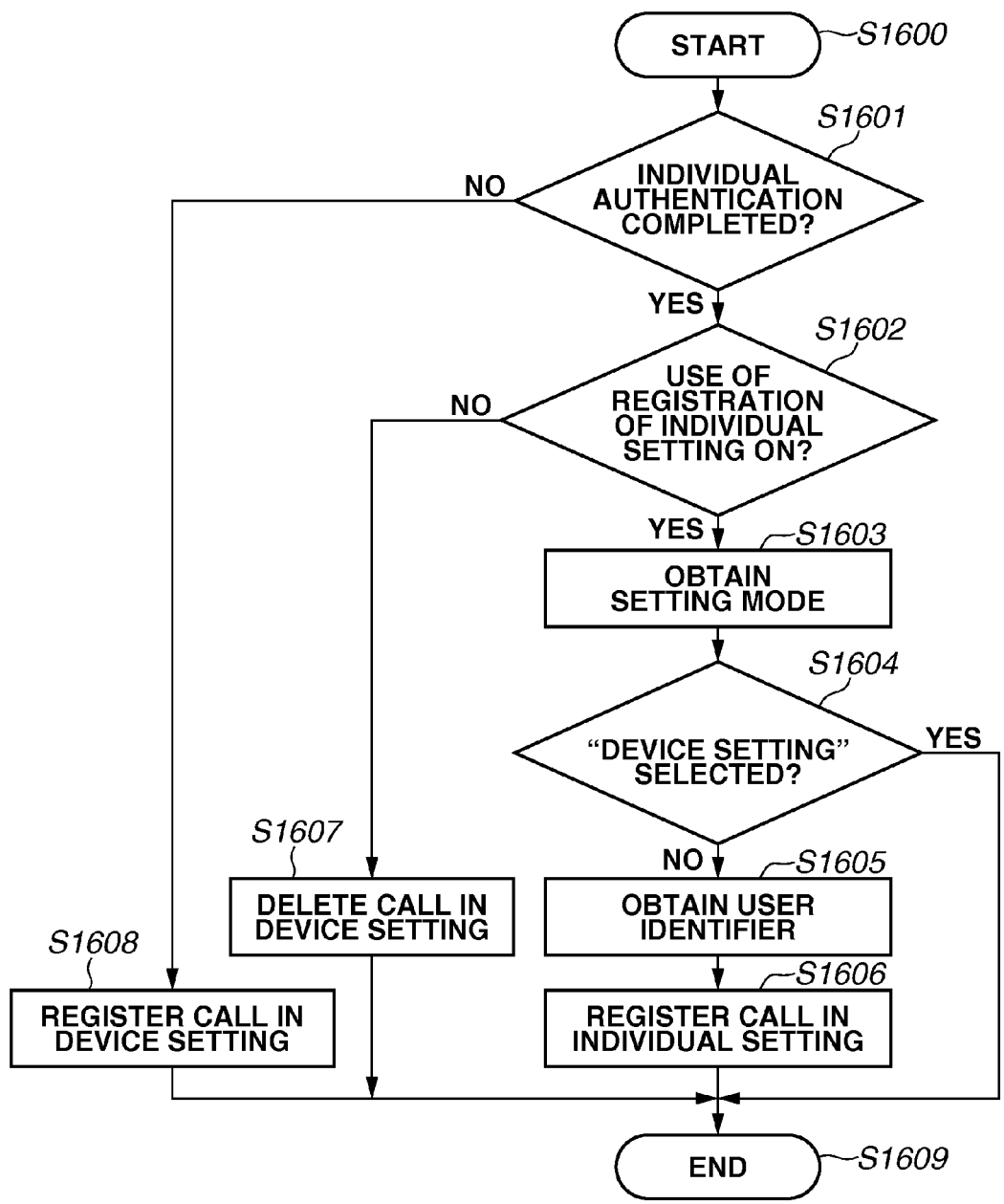
FIG. 16 is a flowchart illustrating an example of call registration or deletion processing.

FIG. 16 is a flowchart illustrating the call registration or deletion processing when logging out in step S1417 in FIG. 14. Each operation illustrated in the flowchart in FIG. 16 is realized by the CPU 2001 of the image forming apparatus 200 executing a control program stored in the ROM or the HDD. The example illustrated in FIG. 16 describes a processing procedure for registering the call setting as the individual setting or the device setting in the setting DB 430 or deleting the call setting registered in the setting DB 430 when a logout instruction is received from a user.

In step S1600, the CPU 2001 starts the call registration processing in response to reception of the logout instruction from a user.

In step S1601, the CPU 2001 determines whether the apparatus is in a state in which the individual authentication has been completed. If it is determined as the non-individual authentication state (NO in step S1601), the CPU 2001 advances the processing to step S1608. In step S1608, the CPU 2001 stores the job setting which is set when the logout instruction is received in step S1600 as the device setting in the setting DB 430.

In the case of the example in FIG. 12, the CPU 2001 creates the operation history data 1221 in the device setting storage area 1220. If the operation history data 1221 is already existing, the CPU 2001 overwrites the operation history data 1221.

When completing the processing in step S1608, then in step S1609, the CPU 2001 terminates the call registration or deletion processing when logging out.

Whereas, if it is determined as the individual authentication state by the authentication control unit 402 (YES in step S1601), the CPU 2001 advances the processing to step S1602. In step S1602, the CPU 2001 determines whether the use of registration of the individual setting is set to ON.

If it is determined that the use of registration of the individual setting is set to OFF (the setting not to register the individual setting) (NO in step S1602), the CPU 2001 advances the processing to step S1607. In step S1607, the CPU 2001 deletes the call setting registered as the device setting in the setting DB 430. In the case of the example in FIG. 12, the CPU 2001 deletes the operation history data 1221 stored in the device setting storage area 1220.

When completing the processing in step S1607, then in step S1609, the CPU 2001 terminates the call registration or deletion processing when logging out.

Whereas, if it is determined that the use of registration of the individual setting is set to ON (the setting to register the individual setting) (YES in step S1602), the CPU 2001 advances the processing to step S1603.

In step S1603, the CPU 2001 obtains a value of the setting mode from the setting DB 430. In step S1604, the CPU 2001 determines whether the setting mode obtained in step S1603 is the "device setting".

If it is determined that the setting mode is the "device setting" (YES in step S1604), in step S1609, the CPU 2001 terminates the call registration or deletion processing when logging out as it is without registering the operation history.

Whereas, if it is determined that the setting mode is the "individual setting" (NO in step S1604), the CPU 2001 advances the processing to step S1605. In step S1605, the CPU 2001 obtains the user identifier of the user authenticated by the authentication control unit 402 from the user information DB 420.

Next, in step S1606, the CPU 2001 associates the job setting which is set when the logout instruction is received in step S1600 with the user identifier obtained in step S1605 and stores the job setting as the individual setting in the setting DB 430.

In the case of the example in FIG. 12, the CPU 2001 creates the operation history data 1211 in the individual setting storage area 1210. If the operation history data 1211 is already existing, the CPU 2001 overwrites the operation history data 1211.

When completing the processing in step S1606, then in step S1609, the CPU 2001 terminates the call registration or deletion processing when logging out.

Figure 17:
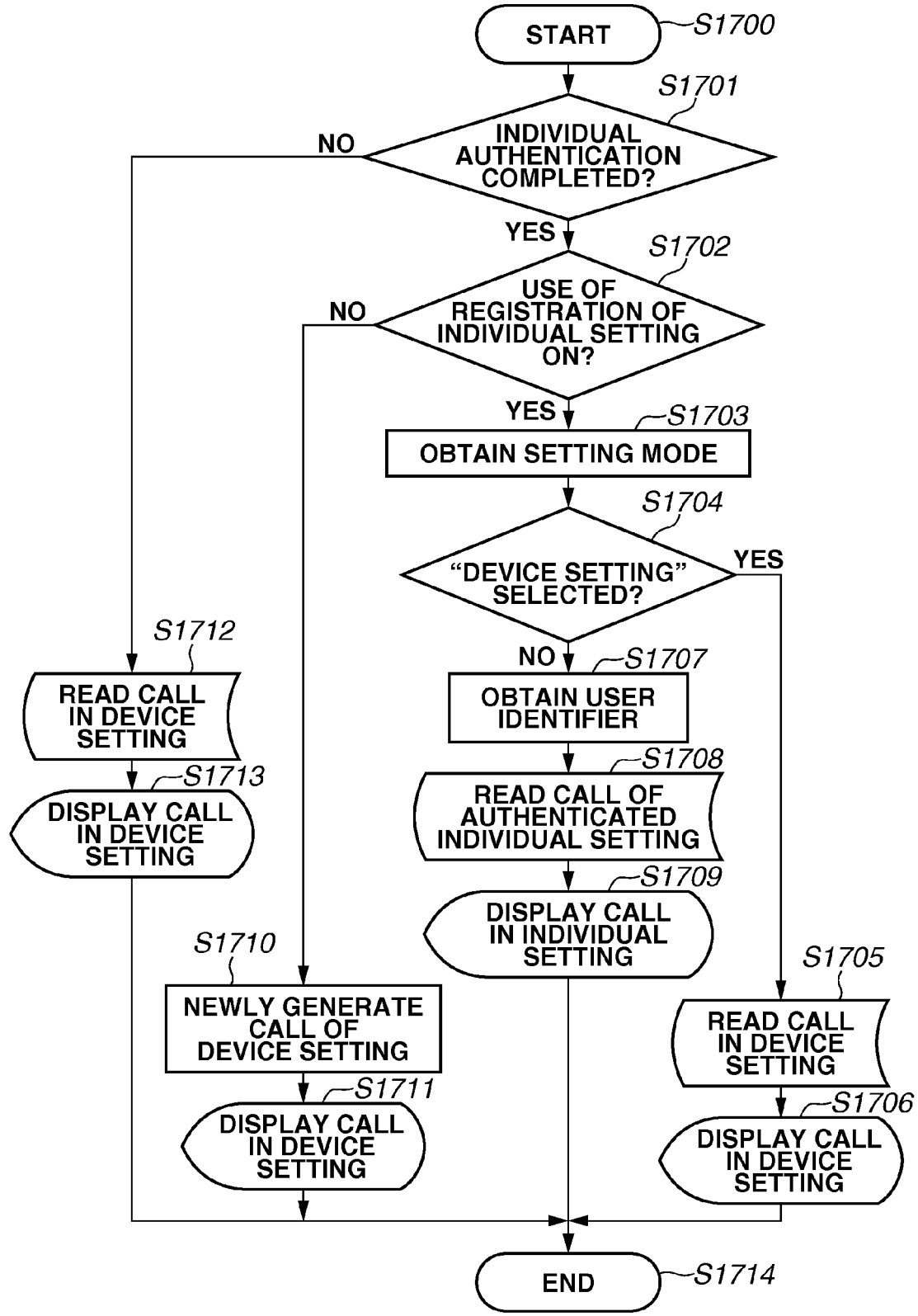
FIG. 17 is a flowchart illustrating an example of call display processing.

FIG. 17 is a flowchart illustrating the call display processing in step S1415 in FIG. 14. Each operation illustrated in the flowchart in FIG. 17 is realized by the CPU 2001 of the image forming apparatus 200 executing a control program stored in the ROM or the HDD. The example illustrated in FIG. 17 describes a processing procedure for obtaining the individual setting or the device setting in the setting DB 430 and displaying the obtained setting on the operation unit 2012 when the call setting display instruction is received from a user.

In step S1700, the CPU 2001 starts the call display processing in response to reception of the call setting display instruction from a user.

In step S1701, the CPU 2001 determines whether the apparatus is in the state in which the individual authentication has been completed. If it is determined as the non-individual authentication state (NO in step S1701), the CPU 2001 advances the processing to step S1712. In step S1712, the CPU 2001 reads the call setting stored as the device setting from the setting DB 430. In the case of the example in FIG. 12, the CPU 2001 obtains the operation history data 1221 in the device setting storage area 1220. In step S1713, the CPU 2001 displays the call setting obtained in step S1712 on the liquid crystal display unit 301. In other words, the CPU 2001 calls the device setting in a reusable manner. Then, in step S1714, the CPU 2001 terminates the call display processing.

Whereas, if it is determined as the individual authentication state by the authentication control unit 402 (YES in step S1701), the CPU 2001 advances the processing to step S1702. In step S1702, the CPU 2001 determines whether the use of registration of the individual setting is set to ON.

If it is determined that the use of registration of the individual setting is set to OFF (the setting not to register the individual setting) (NO in step S1702), the CPU 2001 advances the processing to step S1710. In step S1710, the CPU 2001 deletes the call setting of the device setting stored in the setting DB 430 and newly creates a call setting of a predetermined device setting in the setting DB 430. When an authorized user shares the device setting with other authenticated users, a call setting of a previous user is discarded, and a call setting is newly created. A call setting to be newly created is in a default state. In the case of the example in FIG. 12, the CPU 2001 creates the operation history data 1221 in the default state in the device setting storage area 1220 and obtains the created device setting. The call setting in the default state is determined in advance and stored in, for example, the HDD 2004. In step S1711, the CPU 2001 displays the call setting newly created and obtained in step S1710 on the liquid crystal display unit 301. Then, in step S1714, the CPU 2001 terminates the call display processing.

Whereas, if it is determined that the use of registration of the individual setting is set to ON (the setting to register the individual setting) (YES in step S1702), the CPU 2001 advances the processing to step S1703.

In step S1703, the CPU 2001 obtains a value of the setting mode from the setting DB 430. In step S1704, the CPU 2001 determines whether the setting mode obtained in step S1703 is the "device setting".

If it is determined that the setting mode is the "device setting" (YES in step S1704), the CPU 2001 advances the processing to step S1705. In step S1705, the CPU 2001 reads the call setting stored as the device setting from the setting DB 430. In the case of the example in FIG. 12, the CPU 2001 obtains the operation history data 1221 in the device setting storage area 1220. In step S1706, the CPU 2001 displays the call setting obtained in step S1705 on the liquid crystal display unit 301. Then, in step S1714, the CPU 2001 terminates the call display processing.

Whereas, if it is determined that the setting mode is the "individual setting" (NO in step S1704), the CPU 2001 advances the processing to step S1707. In step S1707, the CPU 2001 obtains the user identifier of the user authenticated by the authentication control unit 402 from the user information DB 420.

Next, in step S1708, the CPU 2001 obtains the call setting of the individual setting associated with the user identifier obtained in step S1707 from the setting DB 430. In the case of the example in FIG. 12, the CPU 2001 obtains the operation history data 1211 in the individual setting storage area 1210. In step S1709, the CPU 2001 displays the call setting obtained in step S1708 on the liquid crystal display unit 301. Then, in step S1714, the CPU 2001 terminates the call display processing.

Specific examples of registration, deletion, and display of the call setting of the copy function are described above, however, a send function and other functions are also similar.

As described above, the image forming apparatus according to the present exemplary embodiment can appropriately register, delete, and display an operation history individually used by an authenticated user and an operation history common in the apparatus shared by unauthenticated users, enable an operator to reuse a desired operation history, and prevent other people from referring to an individual operation history. In other words, an individual setting and a device setting of an operation history are appropriately registered, deleted, and displayed according to a customized setting and a user authentication state, and thus an operator can reuse a desired operation history, and an operation history can be protected from being referred to from other people. Accordingly, the operation history can be effectively used, and the privacy can be protected at the same time.

According to the present exemplary embodiment, it is described that a user performs an operation from the operation unit 2012 of the image forming apparatus 200. However, the present exemplary embodiment can be applied to a case when a user accesses the image forming apparatus 200 from the host computer 11 to refer to an operation history of the user. More specifically, when a reference request of an operation history is made from the host computer 11 to the image forming apparatus 200, the CPU 2001 obtains an operation history according to a customized setting and a user authentication state from the host computer 11 and transmits the obtained operation history to the host computer 11 as is the case with the call display processing illustrated in FIG. 17.

Other Embodiments

Exemplary embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-139012, filed Jul. 4, 2014, which is hereby incorporated by reference herein in its entirety.

What is claimed is:

1. A control method of an image forming apparatus that executes a process of a function, the method comprising:
   setting, for the process of the function, setting information according to an instruction by a user who has logged into the image forming apparatus as an individually authenticated user;
   executing the process of the function using the set setting information, according to an instruction by the user;
   storing the setting information that has been used for the process as setting history into a memory;
   calling and reusing, for the process of the function, the setting information stored as the setting history in the memory;
   selecting a first setting or a second setting;
   in a case where the first setting is selected, storing the setting information having been used for the process as the setting history into the memory in association with the user, wherein the stored setting information is capable of being called and reused not only before the user logs out from the image forming apparatus but also after the user logs into the image forming apparatus again after the user logs out from the image forming apparatus; and
   in a case where the second setting is selected, storing the setting information having been used for the process as the setting history into the memory not in association with the user, wherein the stored setting information is capable of being called and reused before the user logs out from the image forming apparatus but is not capable of being called and reused after the user logs out from the image forming apparatus.

2. The method according to claim 1, further comprising, in a case where the second setting is selected, deleting the setting information stored in the memory as the setting history in response to the log-out of the user.

3. The method according to claim 1, further comprising:
   displaying, to the individually authenticated user, contents of the setting information stored as the setting history before reusing the setting information; and
   reusing the setting information for the process of the function in accordance with an operation of the user.

4. The method according to claim 1, further comprising:
   associating the setting information stored as the setting history with buttons selectable by the individually authenticated user; and
   calling the setting information based on selection of the buttons by the individually authenticated user.

5. The method according to claim 1, wherein only a user with an administrator authority is capable of selecting the first setting or the second setting.

6. The method according to claim 5, further comprising:
   providing, to the user with the administrator authority, a setting screen for selecting either the first setting or the second setting; and
   selecting the first setting or the second setting in accordance with the operation for the setting screen by the user with the administrator authority.

7. The method according to claim 1, further comprising:
receiving a start instruction by the user for starting the process of the function; and
storing the set setting information as setting history into the memory upon receiving the start instruction.

8. The method according to claim 1,
wherein the memory includes an individual setting storage area for storing a setting value for each user and a device setting storage area for storing a setting value shared by plural users;
wherein, in a case where the first setting is selected, the setting information having been used for the process is stored into the individual setting storage area in association with the user; and
wherein, in a case where the second setting is selected, the setting information having been used for the process is stored into the device setting storage area.

9. The method according to claim 8,
wherein, in a case where the process of the function is executed in accordance with an instruction by a user who has not been individually authenticated, the setting information having been used for the process is stored into the device setting storage area irrespective of whether the first setting or the second setting is selected.

10. The method according to claim 1,
wherein the function is any of a copy function of printing image data generated by scanning an image on an original document, a print function of printing image data inputted externally, and a facsimile function of communicating facsimile data.

11. An image forming apparatus that executes a process of a function, comprising:
a memory storing instructions; and
a processor which is capable of executing the instructions causing the image forming apparatus to: set, for the process of the function, setting information according to an instruction by a user who has logged into the image forming apparatus as an individually authenticated user;
execute the process of the function using the setting information, according to an instruction by the user;
store the setting information that has been used for the process as setting history into the memory;
call and reuse, for the process of the function, the setting information stored as the setting history in the memory;
select a first setting or a second setting; and
store, in a case where the first setting is selected, the setting information having been used for the process as the setting history into the memory in association with the user, wherein the stored setting information is capable of being called and reused not only before the user logs out from the image forming apparatus but also after the user logs into the image forming apparatus again after the user logs out from the image forming apparatus, and
in a case where the second setting is selected, to store the setting information having been used for the process as the setting history into the memory not in association with the user, wherein the stored setting information is capable of being called and reused before the user logs out from the image forming apparatus but is not capable of being called and reused after the user logs out from the image forming apparatus.

12. The image forming apparatus according to claim 11, wherein the processor is further capable of executing the instructions causing the image forming apparatus to:
display, to the individually authenticated user, contents of the setting information stored as the setting history before reusing the setting information; and
reuse the setting information for the process of the function in accordance with an operation of the user.

13. The image forming apparatus according to claim 12, wherein the processor is further capable of executing the instructions causing the image forming apparatus to:
delete, in a case where the second setting is selected, the setting information stored in the memory as the setting history in response to the log-out of the user.

14. The image forming apparatus according to claim 11, wherein the processor is further capable of executing the instructions causing the image forming apparatus to:
associate the setting information stored as the setting history with buttons selectable by the individually authenticated user; and
call the setting information based on selection of the buttons by the individually authenticated user.

15. The image forming apparatus according to claim 11, wherein only a user with an administrator authority is capable of selecting the first setting or the second setting.

16. The image forming apparatus according to claim 15, wherein the processor is further capable of executing the instructions causing the image forming apparatus to:
provide, to the user with the administrator authority, a setting screen for selecting either the first setting or the second setting,
wherein the first setting or the second setting is selected in accordance with the operation for the setting screen by the user with the administrator authority.

17. The image forming apparatus according to claim 11, wherein the processor is further capable of executing the instructions causing the image forming apparatus to:
receive a start instruction by the user for starting the process of the function; and
store the set setting information as setting history into the memory upon receiving the start instruction.

18. The image forming apparatus according to claim 11,
wherein the memory includes an individual setting storage area for storing a setting value for each user and a device setting storage area for storing a setting value shared by plural users,
wherein, in a case where the first setting is selected, the setting information having been used for the process is stored into the individual setting storage area in association with the user, and
wherein, in a case where the second setting is selected, the setting information having been used for the process is stored into the device setting storage area.

19. The image forming apparatus according to claim 18,
wherein, in a case where the process of the function is executed in accordance with an instruction by a user who has not been individually authenticated, the setting information having been used for the process is stored into the device setting storage area irrespective of whether the first setting or the second setting is selected.

20. The image forming apparatus according to claim 11,
wherein the function is any of a copy function of printing image data generated by scanning an image on an original document, a print function of printing image data inputted externally, and a facsimile function of communicating facsimile data.

* * * * *